(12) United States Patent
Neff

(10) Patent No.: US 6,244,720 B1
(45) Date of Patent: Jun. 12, 2001

(54) AIR FILTER AND LIGHT APPARATUS

(76) Inventor: Charles W. Neff, 33 Savery Ave., Buzzards Bay, MA (US) 02532

( * ) Notice: Subject to any disclaimer, the term of this patent is extended or adjusted under 35 U.S.C. 154(b) by 0 days.

(21) Appl. No.: 09/470,760

(22) Filed: Dec. 23, 1999

(51) Int. Cl.⁷ ...................................................... F21V 33/00
(52) U.S. Cl. .............................. 362/96; 362/253; 55/385; 55/385.1
(58) Field of Search ............................. 362/96, 218, 149, 362/253, 216; 416/5; 55/385.1, 385, 470, 471, 472, 473

(56) References Cited

U.S. PATENT DOCUMENTS

| | | |
|---|---|---|
| D. 383,202 | 9/1997 | Meister et al. . |
| 4,439,816 | 3/1984 | Litchfield . |
| 4,849,862 * | 7/1989 | Diskin et al. ........................... 362/96 |
| 4,926,293 | 5/1990 | Saba . |
| 5,189,412 | 2/1993 | Mehta et al. . |
| 5,443,625 | 8/1995 | Schaffhausen . |

* cited by examiner

Primary Examiner—Sandra O'Shea
Assistant Examiner—Bao Truong

(57) ABSTRACT

A air filter and light apparatus for filtering the air of a room while simultaneously illuminating the room. The air filter and light apparatus includes a base portion having a bottom wall. The bottom wall has a peripheral edge. A side wall extends away from and is integrally coupled to the peripheral edge. The side wall has a plurality of slots therein. A motor is fixedly mounted to the bottom wall. A plurality of wires deliver power to the motor. The wires are operationally coupled to a power source and to the motor. A fan for directing airflow from a central portion of the base through the slots is rotatably coupled to the motor. A cover for the base portion has a central portion having a bore therein. A light source illuminates the cover. The light source is mounted in the cover. A filter for filtering the air is mounted in the bore of the cover. An actuator controls the motor and the light source.

13 Claims, 3 Drawing Sheets

AIR FILTER AND LIGHT APPARATUS

BACKGROUND OF THE INVENTION

1. Field of the Invention

The present invention relates to air filters and more particularly pertains to a new air filter and light apparatus for filtering the air of a room while simultaneously illuminating the room.

2. Description of the Prior Art

The use of air filters is known in the prior art. More specifically, air filters heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,849,862; U.S. Pat. No. 5,443,625; U.S. Pat. No. 5,189,412; U.S. Pat. No. 4,439,816; U.S. Pat. No. 4,962,293; and U.S. Des. Pat. No. 383,202.

While these devices fulfill their respective, particular objectives and requirements, the aforementioned patents do not disclose a new air filter and light apparatus. The inventive device includes a base portion having a bottom wall. The bottom wall has a peripheral edge. A side wall extends away from and is integrally coupled to the peripheral edge. The side wall has a plurality of slots therein. A motor is fixedly mounted to the bottom wall. A plurality of wires deliver power to the motor. The wires are operationally coupled to a power source and to the motor. A fan for directing airflow from a central portion of the base through the slots is rotatably coupled to the motor. A cover for the base portion has a central portion having a bore therein. A light source illuminates the cover. The light source is mounted in the cover. A filter for filtering the air is mounted in the bore of the cover. An actuator controls the motor and the light source.

In these respects, the air filter and light apparatus according to the present invention substantially departs from the conventional concepts and designs of the prior art, and in so doing provides an apparatus primarily developed for the purpose of filtering the air of a room while simultaneously illuminating the room.

SUMMARY OF THE INVENTION

In view of the foregoing disadvantages inherent in the known types of air filters now present in the prior art, the present invention provides a new air filter and light apparatus construction wherein the same can be utilized for filtering the air of a room while simultaneously illuminating the room.

The general purpose of the present invention, which will be described subsequently in greater detail, is to provide a new air filter and light apparatus apparatus and method which has many of the advantages of the air filters mentioned heretofore and many novel features that result in a new air filter and light apparatus which is not anticipated, rendered obvious, suggested, or even implied by any of the prior art air filters, either alone or in any combination thereof.

To attain this, the present invention generally comprises a base portion having a bottom wall. The bottom wall has a peripheral edge. A side wall extends away from and is integrally coupled to the peripheral edge. The side wall has a plurality of slots therein. A motor is fixedly mounted to the bottom wall. A plurality of wires deliver power to the motor. The wires are operationally coupled to a power source and to the motor. A fan for directing airflow from a central portion of the base through the slots is rotatably coupled to the motor. A cover for the base portion has a central portion having a bore therein. A light source illuminates the cover. The light source is mounted in the cover. A filter for filtering the air is mounted in the bore of the cover. An actuator controls the motor and the light source.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new air filter and light apparatus apparatus and method which has many of the advantages of the air filters mentioned heretofore and many novel features that result in a new air filter and light apparatus which is not anticipated, rendered obvious, suggested, or even implied by any of the prior art air filters, either alone or in any combination thereof.

It is another object of the present invention to provide a new air filter and light apparatus which may be easily and efficiently manufactured and marketed.

It is a further object of the present invention to provide a new air filter and light apparatus which is of a durable and reliable construction.

An even further object of the present invention is to provide a new air filter and light apparatus which is susceptible of a low cost of manufacture with regard to both materials and labor, and which accordingly is then susceptible of low prices of sale to the consuming public, thereby making such air filter and light apparatus economically available to the buying public.

Still yet another object of the present invention is to provide a new air filter and light apparatus which provides in the apparatuses and methods of the prior art some of the advantages thereof, while simultaneously overcoming some of the disadvantages normally associated therewith.

Still another object of the present invention is to provide a new air filter and light apparatus for filtering the air of a room while simultaneously illuminating the room.

Yet another object of the present invention is to provide a new air filter and light apparatus which includes a base portion having a bottom wall. The bottom wall has a peripheral edge. A side wall extends away from and is integrally coupled to the peripheral edge. The side wall has a plurality of slots therein. A motor is fixedly mounted to the bottom wall. A plurality of wires deliver power to the motor. The wires are operationally coupled to a power source and to the motor. A fan for directing airflow from a central portion of the base through the slots is rotatably coupled to the motor. A cover for the base portion has a central portion having a bore therein. A light source illuminates the cover. The light source is mounted in the cover. A filter for filtering the air is mounted in the bore of the cover. An actuator controls the motor and the light source.

Still yet another object of the present invention is to provide a new air filter and light apparatus that has a remote controlled actuator for ease of use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
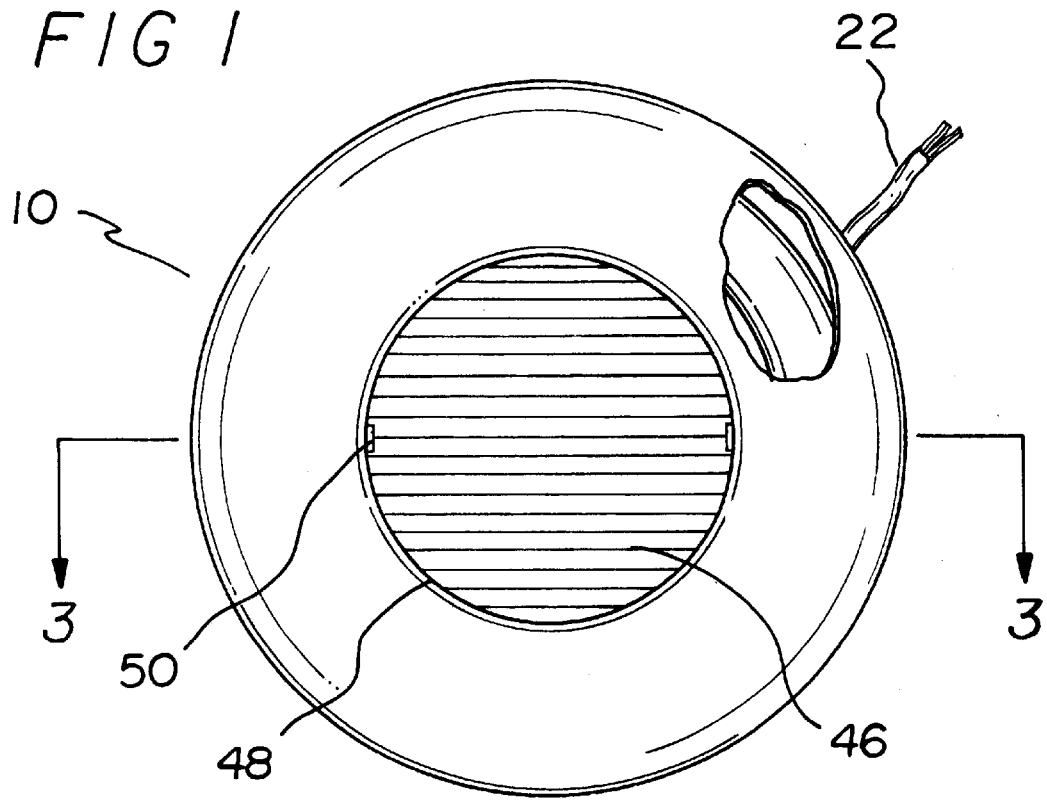
FIG. 1 is a schematic plan view of a new air filter and light apparatus according to the present invention.
Figure 2:
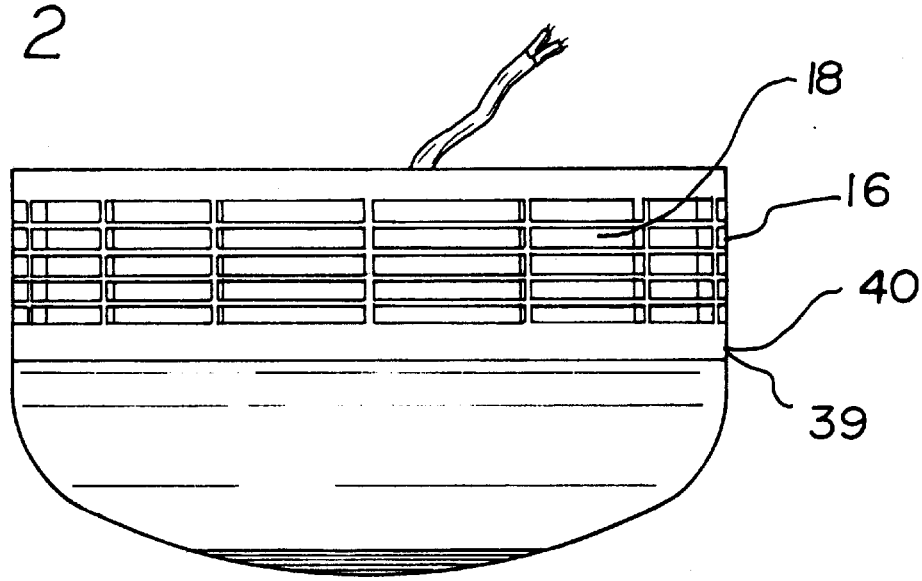
FIG. 2 is a schematic side view of the present invention.
Figure 3:
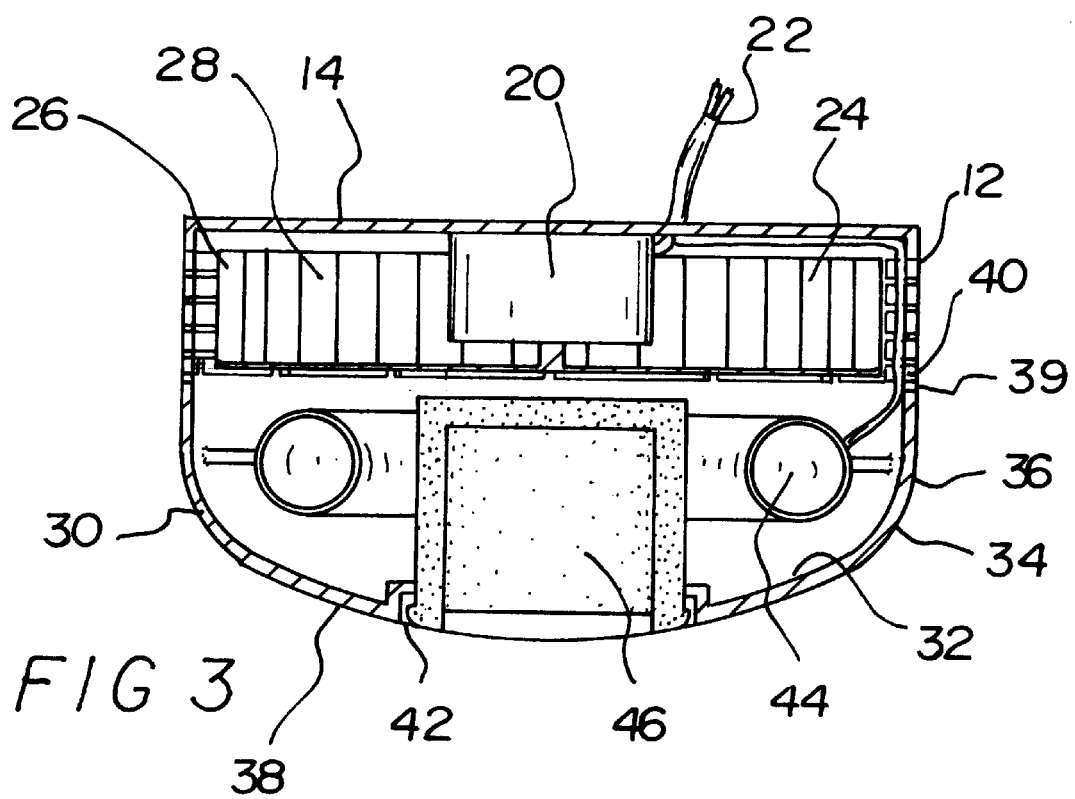
FIG. 3 is a schematic cross-sectional side view along line 3-3-3 of the present invention.
Figure 4:
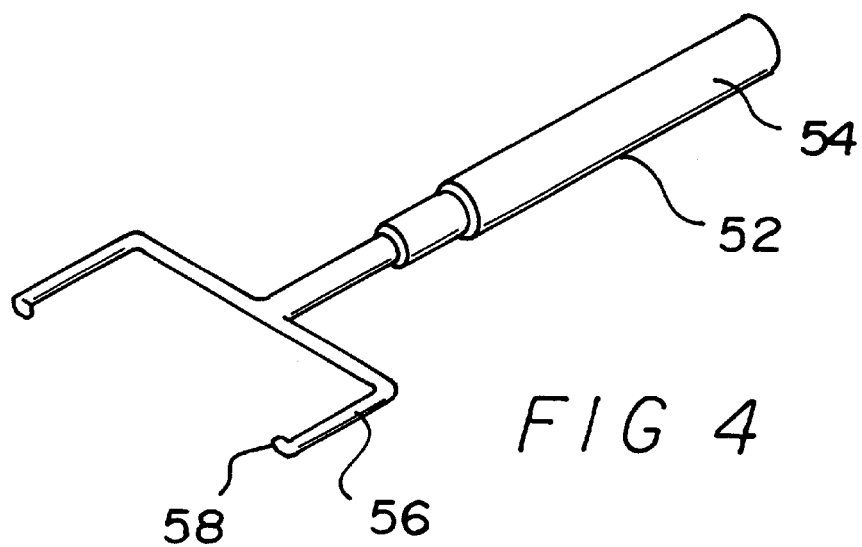
FIG. 4 is a schematic perspective view of the filter removal tool of the present invention.
Figure 5:
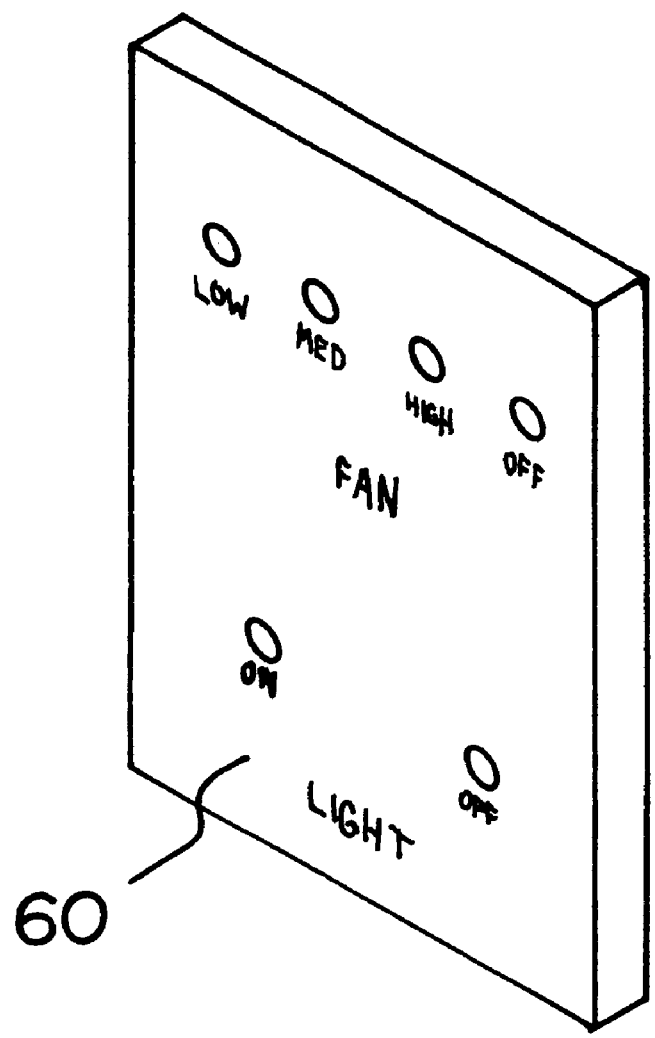
FIG. 5 is a schematic perspective view of the actuator of the present invention.

With reference now to the drawings, and in particular to FIGS. 1 through 5 thereof, a new air filter and light apparatus embodying the principles and concepts of the present invention and generally designated by the reference numeral 10 will be described.

As best illustrated in FIGS. 1 through 5, the air filter and light apparatus 10 generally comprises a base portion 12. The base portion has a bottom wall 14. The bottom wall 14 has a peripheral edge. A side wall 16 extends away from and is integrally coupled to the peripheral edge. The side wall 16 has a plurality of slots 18 therein. Preferably, the bottom wall 14 has a generally annular shape.

A motor 20 is fixedly mounted to the bottom wall 14. The motor 20 is generally located in a medial portion of the bottom wall 14. The motor 20 ideally has variable speeds and is an electric motor.

A plurality wires 22 delivers power to the motor 20. The wires 22 are operationally coupled to a power source and to the motor. The wire extend through the bottom wall 14.

A fan 24 directs airflow from a central portion of the base portion 12 through the slots 18. The fan 24 is annular with a peripheral wall 26. The peripheral wall has a plurality of slots therein. A plurality of blades 28 is fixedly coupled to an exterior surface of the peripheral wall 26. Each of the blades 28 is located generally adjacent to one of the slots. The fan 24 is rotatably coupled to the motor 20.

A cover 30 for the base portion 12 has an interior surface 32 and an exterior surface 34. The cover 30 has a side wall 36 and a top wall 38. The top wall 38 has a generally circular shape. The side wall 36 of the cover has a peripheral edge 39. The peripheral edge 39 of the side wall is adapted to releasably couple to a peripheral edge 40 of the side wall 16 of the base portion 12. A central portion of the cover has a bore 42 therein. The top wall 38 is preferably domed. The cover 30 is formed from translucent material.

A light source 44 illuminates the cover 30. The light source 44 is mounted in the cover 30. The light source 44 is operationally coupled to the wires 22. The light source 44 comprises a light bulb having a generally annular shape.

A filter 46 filters the air. The filter 46 is air permeable and is adapted to remove particles from the air. The filter 46 is generally cylindrical. The filter 46 has a diameter substantially equal to a diameter of the bore 42 in the top wall of the cover. The diameter of the filter 46 is such that the filter 46 may be releasably lodged in the bore 42. A top edge 48 of the filter 46 has a pair of opposite depressions 50. The depressions 50 aid in removal of the filter 46 from the bore 42. A filter 46 removal tool 52 having a telescoping 54 arm has an end with two fingers 56 thereon. Each finger has a bent portion 58 for insertion into the depressions 50 of the filter 46 for removing the filter.

An actuator 60 controls the motor 20 and the light source 44. Preferably, the actuator 60 is adapted to remotely control the motor and the light source.

In use, the apparatus 10 may be mounted to a wall, ceiling or placed on a surface. The air filter 46 and light 44 work independently of each other. When the motor 20 is turned on, air is brought from the room, through the filter 46 and out of the slots 18 in the base portion 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An air filter and light apparatus for filtering air in a room, said apparatus comprising:

a base portion, said base portion having a bottom wall, said bottom wall having a peripheral edge, a side wall extending away from and being integrally coupled to said peripheral edge, said side wall having a plurality of slots therein;

a motor, said motor being fixedly mounted to said bottom wall;

a plurality of wires for delivering power to said motor, said wires being operationally coupled to a power source and to said motor;

a fan for directing airflow from a central portion of said base through said slots, said fan being rotatably coupled to said motor;

a cover for said base portion, a central portion of said cover having a bore therein;

a light source for illuminating the cover, said light source being mounted in said cover;

a filter for filtering the air, said filter being mounted in said bore of said cover, said filter being mounted in said cover such that airflow passes through said filter before flowing through said fan; and an actuator for controlling said motor and said light source; and wherein said light extends around said filter.

2. The air filter and light apparatus as in claim 1, wherein said base portion comprises:

said bottom wall of said base portion having a generally annular shape.

3. The air filter and light apparatus as in claim 1, wherein said motor further comprises:

said motor being generally located in a medial portion of said bottom wall, said motor having variable speeds, said motor being an electric motor.

4. The air filter and light apparatus as in claim 1, said fan further comprising:

said fan being annular with a peripheral wall, said peripheral wall having a plurality of slots therein, a plurality of blades being fixedly coupled to an exterior surface of said peripheral wall, each of said blades being located generally adjacent to one of said slots.

5. The air filter and light apparatus as in claim 4, wherein said cover further comprises:

said cover having an interior surface and an exterior surface, said cover having a side wall and a top wall, said top wall having a generally circular shape, said side wall of said cover having a peripheral edge, said peripheral edge of said side wall being adapted to releasably couple to a peripheral edge of said side wall of said base portion.

6. The air filter and light apparatus as in claim 5, wherein said cover comprises:

said top wall being domed.

7. The air filter and light apparatus as in claim 1, wherein said light source comprises:

said light source being operationally coupled to said wires, said light source comprising a light bulb having a generally annular shape.

8. The air filter and light apparatus as in claim 6, wherein said filter comprises:

said filter being air permeable, said filter being adapted to remove particles from the air, said filter being generally cylindrical, said filter having a diameter substantially equal to a diameter of said bore in said top wall of said cover, wherein said diameter of said filter is such that said filter may be releasably lodged in said bore.

9. The air filter and light apparatus as in claim 8, wherein said filter comprises:

a top edge of said filter having a pair of opposite depressions, wherein said depressions aid in removal of said filter from said bore.

10. An air filter and light apparatus for filtering air in a room, said apparatus comprising:

a base portion, said base portion having a bottom wall, said bottom wall having a peripheral edge, a side wall extending away from and being integrally coupled to said peripheral edge, said side wall having a plurality of slots therein, said bottom wall having a generally annular shape;

a motor, said motor being fixedly mounted to said bottom wall, said motor being generally located in a medial portion of said bottom wall, said motor having variable speeds, said motor being an electric motor;

a plurality of wires for delivering power to said motor, said wires being operationally coupled to a power source and to said motor;

a fan for directing airflow from a central portion of said base through said slots, said fan being annular with a peripheral wall, said peripheral wall having a plurality of slots therein, a plurality of blades being fixedly coupled to an exterior surface of said peripheral wall, each of said blades being located generally adjacent to one of said slots, said fan being rotatably coupled to said motor;

a cover for said base portion, said cover having an interior surface and an exterior surface, said cover having a side wall and a top wall, said top wall having a generally circular shape, said side wall of said cover having a peripheral edge, said peripheral edge of said side wall being adapted to releasably couple to a peripheral edge of said side wall of said base portion, a central portion of said cover having a bore therein, said top wall being domed, said cover being formed from translucent material;

a light source for illuminating the cover, said light source being mounted in said cover, said light extending around an outer edge of said bore, said light source being operationally coupled to said wires, said light source comprising a light bulb having a generally annular shape;

a filter for filtering the air, said filter being air permeable, said filter being adapted to remove particles from the air, said filter being generally cylindrical, said filter having a diameter substantially equal to a diameter of said bore in said top wall of said cover, wherein said diameter of said filter is such that said filter may be releasably lodged in said bore, a top edge of said filter having a pair of opposite depressions, wherein said depressions aid in removal of said filter from said bore, said filter being mounted in said cover such that airflow passes through said filter before flowing through said fan; and an actuator for controlling said motor and said light source, said actuator being adapted to remotely control said motor and said light source.

11. The air filter and light apparatus of claim 1, wherein said filter has an upper surface and a lower surface, said lower surface being concave to increase a size of said lower surface for providing a greater area to collect airborne particles.

12. The air filter and light apparatus of claim 11, wherein the lower surface of said filter has a substantially cylindrical shape.

13. The air filter and light apparatus of claim 1, wherein between filter and said light source is an open space for permitting filtered air flow from said filter to pass by said light source prior to entering said fan.

* * * * *